United States Patent
Harada et al.

(10) Patent No.: US 9,180,869 B2
(45) Date of Patent: Nov. 10, 2015

(54) HYBRID DRIVE SYSTEM

(75) Inventors: Taku Harada, Nisshin (JP); Masatoshi Ito, Okazaki (JP); Kazuyuki Shiiba, Miyoshi (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/355,883

(22) PCT Filed: Nov. 11, 2011

(86) PCT No.: PCT/JP2011/006319
§ 371 (c)(1),
(2), (4) Date: May 2, 2014

(87) PCT Pub. No.: WO2013/069068
PCT Pub. Date: May 16, 2013

(65) Prior Publication Data
US 2014/0277892 A1    Sep. 18, 2014

(51) Int. Cl.
| | |
|---|---|
| *B60L 11/00* | (2006.01) |
| *B60W 20/00* | (2006.01) |
| *B60K 6/445* | (2007.10) |
| *B60W 10/06* | (2006.01) |
| *B60W 10/08* | (2006.01) |
| *B60W 10/30* | (2006.01) |
| *B60W 10/10* | (2012.01) |
| *B60W 10/26* | (2006.01) |

(52) U.S. Cl.
CPC .............. *B60W 20/108* (2013.01); *B60K 6/445* (2013.01); *B60W 10/06* (2013.01); *B60W 10/08* (2013.01); *B60W 10/10* (2013.01); *B60W 10/26* (2013.01); *B60W 10/30* (2013.01); *B60W 20/00* (2013.01); *Y02T 10/6239* (2013.01); *Y02T 10/6286* (2013.01); *Y10S 903/904* (2013.01); *Y10S 903/93* (2013.01)

(58) Field of Classification Search
CPC ... B60W 20/108; B60W 10/06; B60W 10/08; B60W 10/26; B60W 10/10; Y10S 903/93; Y10S 903/904
USPC .......................................................... 701/22
See application file for complete search history.

(56) References Cited

U.S. PATENT DOCUMENTS

| | | | |
|---|---|---|---|
| 5,993,169 A | 11/1999 | Adachi et al. | |
| 7,971,665 B2* | 7/2011 | Tumback et al. | 180/65.21 |
| 8,060,266 B2* | 11/2011 | Hidaka et al. | 701/22 |
| 2008/0154455 A1* | 6/2008 | Hidaka et al. | 701/22 |

FOREIGN PATENT DOCUMENTS

| | | |
|---|---|---|
| JP | 62-191223 | 8/1987 |
| JP | 8-324262 | 12/1996 |
| JP | 10-89446 | 4/1998 |

* cited by examiner

*Primary Examiner* — Mary Cheung
*Assistant Examiner* — Michael Berns
(74) *Attorney, Agent, or Firm* — Finnegan, Henderson, Farabow, Garrett & Dunner, LLP

(57) ABSTRACT

In order to provide a hybrid drive system that suppresses a useless change of a pump driving path and that has a high durability, a plurality of drive sources, an output mechanism that outputs rotational power to an outside on the basis of those operation states, a control device that controls the operation states of the drive sources, an oil pump, and a pump input selecting mechanism that causes the oil pump to be driven with one of a plurality of rotary shafts to which power from the corresponding drive sources is inputable, are included, and the control device controls the rotation speeds (V1, V2) of the plurality of rotary shafts to unequal speeds by controlling the operation state of one of the plurality of drive sources.

8 Claims, 7 Drawing Sheets

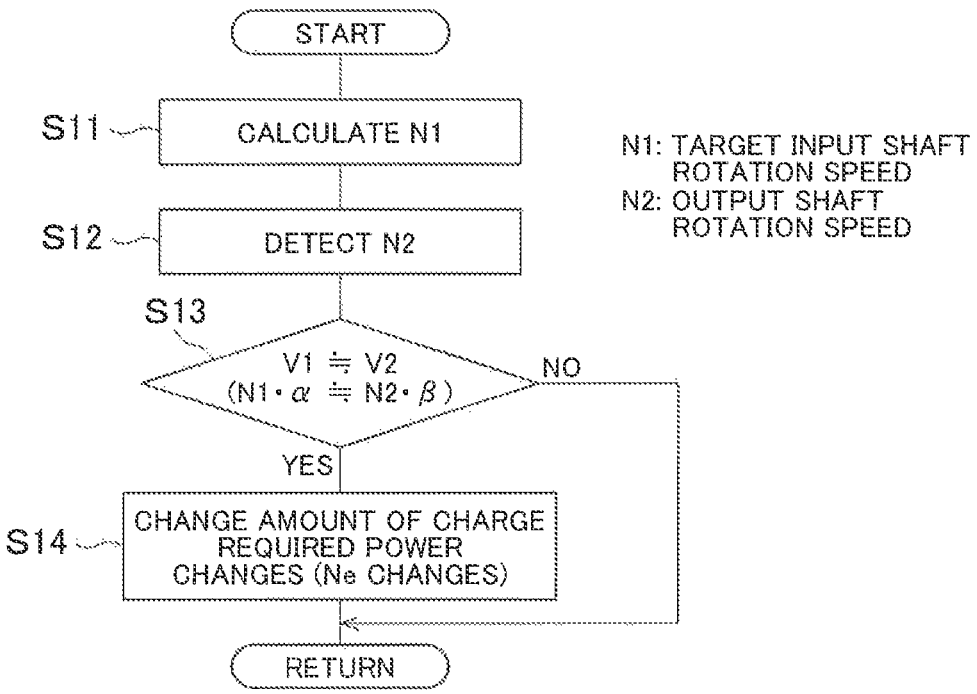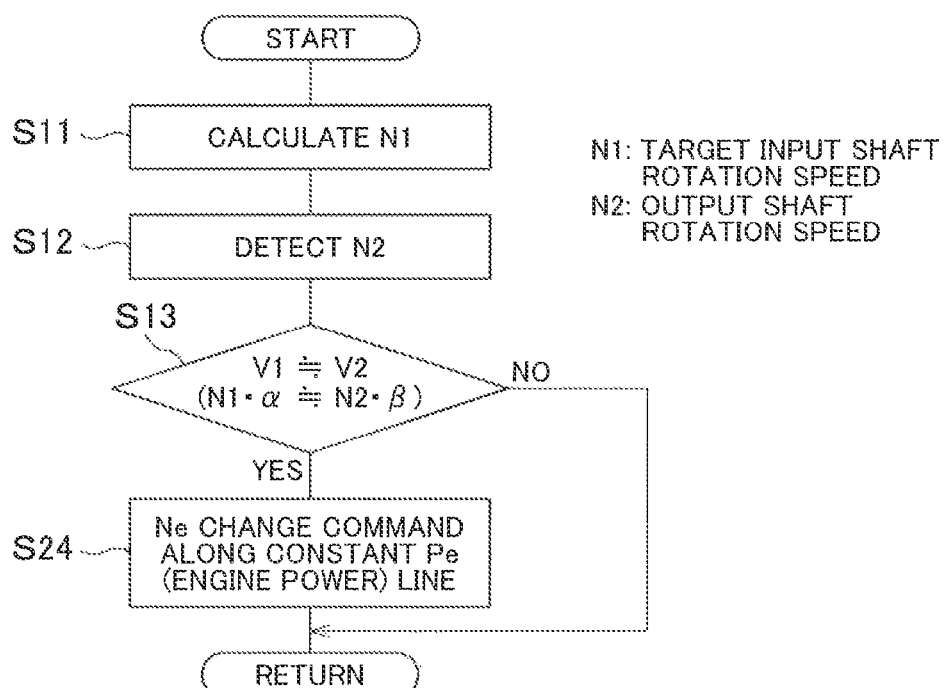

HYBRID DRIVE SYSTEM

CROSS-REFERENCE TO RELATED APPLICATIONS

This application is a national phase application of International Application No. PCT/JP2011/006319, filed Nov. 11, 2011, the content of which is incorporated herein by reference.

TECHNICAL FIELD

The invention relates to a hybrid drive system including a plurality of different drive sources and, more particularly, to a hybrid drive system including an oil pump that is able to change input power on the basis of operation states of a plurality of drive sources.

BACKGROUND ART

A hybrid drive system including a plurality of drive sources is, for example, employed for a traveling drive system of a vehicle, and drives the vehicle by using rotational power from at least one of an internal combustion engine and an electric motor. In such a hybrid drive system, oil for lubrication of gears in an incorporated power split mechanism, and the like, cooling of a generator-motor, or the like, is pressurized and circulated by an oil pump.

As an existing hybrid drive system including an oil pump, there is, for example, the one in which, in order to make it possible to supply oil even during EV (electric vehicle) running, an input shaft of a power split mechanism to which power from an engine is input and an output shaft of the power split mechanism that outputs power from at least one of the engine and a motor to a traveling drive system are respectively coupled to the oil pump via one-way clutches such that power is inputable, and the oil pump is driven by one of both shafts, having a higher rotation speed (see Patent Documents 1, 2).

RELATED ART DOCUMENT

Patent Document 1: Japanese Patent Application Publication No. 08-324262 (JP 08-324262 A)
Patent Document 2: Japanese Patent Application Publication No. 10-89446 (JP 10-89446 A)

SUMMARY OF THE INVENTION

Problem to be Solved by the Invention

However, in the above-described existing hybrid drive system, there is a problem that, when the operation point of the oil pump stagnates around a boundary line (input shaft change line) between an operation region in which the oil pump is driven by the input shaft of the power split mechanism and an operation region in which the oil pump is driven by the output shaft of the mechanism, pump driving paths from both shafts with the corresponding one-way clutches are frequently changed with rotation fluctuations of the input shaft or output shaft (rotation fluctuations of the engine, a road surface fluctuation component from tires, or the like).

That is, when the respective rotation speeds of the two shafts that are able to drive the oil pump substantially coincide with each other so as to fall within the mutual rotation speed fluctuation ranges, there occurs a so-called hunting phenomenon in which the on/off states of the one-way clutches in the two pump driving paths are repeated although the driving rotation speed of the oil pump is substantially the same. Therefore, there is a problem that the service life of the one-way clutches tends to decrease due to an increase in the number of changes of the one-way clutches and, as a result, reliability to the durability of the hybrid drive system is impaired.

The invention provides a hybrid drive system that suppresses useless changes of the pump driving paths and that has an excellent durability.

Means for Solving the Problem

To solve the above problem, a hybrid drive system according to the invention includes: (1) a plurality of mutually different drive sources; an output mechanism that outputs rotational power from at least one of the plurality of drive sources to an outside on the basis of operation states of the plurality of drive sources; a control device that controls the operation states of the plurality of drive sources; an oil pump including a pump rotor that rotates so as to pressurize and discharge oil; and a pump input selecting mechanism that includes a plurality of rotary shafts to which rotational power from each of the drive sources is inputable and that causes the pump rotor to rotate with the use of one of the rotary shafts, having a higher rotation speed, and the control device controls the rotation speeds of the plurality of rotary shafts to unequal speeds.

In this invention, the operation states of the plurality of drive sources are controlled by the control device such that the rotation speeds of the plurality of rotary shafts are unequal to each other, that is, become unequal (unequal speeds). Thus, a frequent repetition of a selection change of the input rotary shafts in the pump input selecting mechanism does not occur any more because of substantial coincidence of the rotation speeds of both the rotary shafts, so it is possible to suppress a useless change of the pump driving path.

In the hybrid drive system according to the invention, having the above configuration, preferably, (2) the control device changes the operation state of one of the plurality of drive sources such that the rotation speeds of the plurality of rotary shafts are returned to fall outside a preset equal speed region on the condition that the rotation speeds of the plurality of rotary shafts fall within the equal speed region. With this configuration, when the possibility of a frequent repetition of a selection change of the input rotary shafts in the pump input selecting mechanism increases because the rotation speeds of the plurality of rotary shafts fall within the preset equal speed region, the operation state of one of the plurality of drive sources changes, and rotation of one rotary shaft rotating the pump rotor and rotation of the other rotary shaft are returned so as to fall outside the equal speed region, so the frequency of a selection change is appropriately suppressed.

In the case of the configuration of the above (2), preferably, (3) the plurality of drive sources include an internal combustion engine and an electric motor that is able to generate electric power, and the control device changes a power generation load of the electric motor on the condition that the rotation speeds of the plurality of rotary shafts fall within the equal speed region. With this configuration, when the possibility of a frequent repetition of a selection change of the input rotary shafts in the pump input selecting mechanism increases, the rotation speed of one rotary shaft that is rotating the pump rotor and the rotation speed of the other rotary shaft are returned to fall outside the equal speed region because of the change in a power generation load of the electric moor that is able to generate electric power, so the frequency of a selection change is appropriately suppressed.

In the case of the configuration of the above (3), preferably, (4) a battery that is charged with generated electric power from the electric motor is further included, and the control device changes an amount of charge of the battery on the condition that the rotation speeds of the plurality of rotary shafts fall within the equal speed region. With this configuration, when the possibility of a frequent repetition of a selection change of the input rotary shafts in the pump input selecting mechanism increases, an output that is required for the internal combustion engine changes because of the change in the amount of charge of the battery, and the rotation speed of one rotary shaft that is rotating the pump rotor and the rotation speed of the other rotary shaft are returned so as to fall outside the equal speed region, so the frequency of a selection change is appropriately suppressed.

In the case of the configuration of the above (3) or (4), preferably, (5) auxiliaries that operate on generated electric power from the electric motor are further included, and the control device changes operation states of the auxiliaries on the condition that the rotation speeds of the plurality of rotary shafts fall within the equal speed region. With this configuration, when the possibility of a frequent repetition of a selection change of the input rotary shafts in the pump input selecting mechanism increases, power that is consumed by the vehicle changes because of the change in the operation states of the auxiliaries, the output that is required for the internal combustion engine changes, and the rotation speed of one rotary shaft rotating the pump rotor and the rotation speed of the other rotary shaft are returned so as to fall outside the equal speed region, so the frequency of a selection change is appropriately suppressed.

In the case of the configuration of the above (2) to (5), in the hybrid drive system according to the invention, preferably, (6) the plurality of drive sources include an internal combustion engine, and the control device changes a rotation speed or torque of the internal combustion engine while keeping an output of the internal combustion engine on the condition that the rotation speeds of the plurality of rotary shafts fall within the equal speed region. With this configuration, when the possibility of a frequent repetition of a selection change of the input rotary shafts in the pump input selecting mechanism increases, the output rotation speed of the internal combustion engine changes without changing the output of the internal combustion engine. Thus, the rotation speed of one rotary shaft that is rotating the pump rotor and the rotation speed of the other rotary shaft are returned so as to fall outside the equal speed region, so the frequency of a selection change is appropriately suppressed.

In this case, preferably, the control device changes the rotation speed or torque of the internal combustion engine by changing any one of ignition timing, valve timing and throttle opening degree of the internal combustion engine. With this configuration, it is possible to appropriately change the speed or torque of rotation that is output from the internal combustion engine with the use of the existing control system of the internal combustion engine, and, moreover, it is also possible to change the rotation speed of the internal combustion engine without changing the output of the internal combustion engine.

In the case of the configuration of the above (2) to (6), in the hybrid drive system according to the invention, (7) a transmission mechanism that shifts the rotational power that is output from the output mechanism may be further included, and the control device may shift a speed ratio of the transmission mechanism to a different speed ratio on the condition that the rotation speeds of the plurality of rotary shafts fall within the equal speed region. With this configuration, when the possibility of a frequent repetition of a selection change of the input rotary shafts in the pump input selecting mechanism increases, the speed ratio of the transmission mechanism is shifted to a different speed ratio. Thus, the rotation speed of the internal combustion engine is changed without changing the output that is required for the internal combustion engine, and the rotation speed of one rotary shaft that is rotating the pump rotor and the rotation speed of the other rotary shaft are returned so as to fall outside the equal speed region, so the frequency of a selection change is appropriately suppressed.

In the hybrid drive system having the configuration of the above (7), preferably, (8) the control device returns the speed ratio of the transmission mechanism to an original speed ratio when the rotation speeds of the plurality of rotary shafts fall outside the equal speed region. With this configuration, when the possibility of a frequent repetition of a selection change of the input rotary shafts in the pump input selecting mechanism decreases, the speed ratio of the transmission mechanism is shifted to an optimal speed ratio, so a fuel consumption improves.

In the hybrid drive system having the configuration of the above (2) to (4), preferably, (9) the electric motor includes a first electric motor and a second electric motor, each of which is able to generate electric power, the output mechanism includes three rotation transmission elements that engage with each other such that rotation is transmittable, the three rotation transmission elements are formed of an input-side rotation transmission element that is coupled to the internal combustion engine, a first output-side rotating element that is coupled to the first electric motor, and a second output-side rotating element that is coupled to the second electric motor, rotational power that is input from the internal combustion engine to the input-side rotation transmission element is output from the second output-side rotating element to the outside, and the control device changes a power generation load of the first electric motor on the condition that the rotation speeds of the plurality of rotary shafts fall within the preset equal speed region. With this configuration, a simple power split mechanism can be configured, and, moreover, it is possible to control the rotation speeds of the plurality of rotary shafts to unequal speeds by controlling the power generation load of the first electric motor independent of the vehicle speed.

Effect of the Invention

According to the invention, when the rotation speed of one rotary shaft that is rotating the pump rotor and the rotation speed of the other rotary shaft get close to each other, the operation state(s) of one or a plurality of the drive sources are controlled such that the rotation speeds of these plurality of rotary shafts are unequal to each other, so it is possible to prevent a frequent repetition of a selection change of the input rotary shafts in the pump input selecting mechanism because of substantial coincidence of the rotation speeds of both the rotary shafts. As a result, it is possible to provide the hybrid drive system that suppresses a useless change of the pump driving path and has a high durability.

BRIEF DESCRIPTION OF THE DRAWINGS

FIG. 5 is a flowchart that shows the flow of an oil pump input change suppressing control program that is executed in the hybrid drive system according to the first embodiment of the invention.

FIG. 6 is a flowchart that shows the flow of an oil pump input change suppressing control program that is executed in a hybrid drive system according to a second embodiment of the invention.

MODES FOR CARRYING OUT THE INVENTION

Hereinafter, preferred embodiments of the invention will be described with reference to the drawings.

First Embodiment

FIG. 1 to FIG. 5 show a hybrid drive system for a vehicle according to a first embodiment of the invention. The present embodiment is illustrated as a system configuration in which an engine is arranged transversely; however, of course, a system configuration in which an engine is arranged longitudinally is applicable.

Initially, the configuration will be described.

Figure 1:
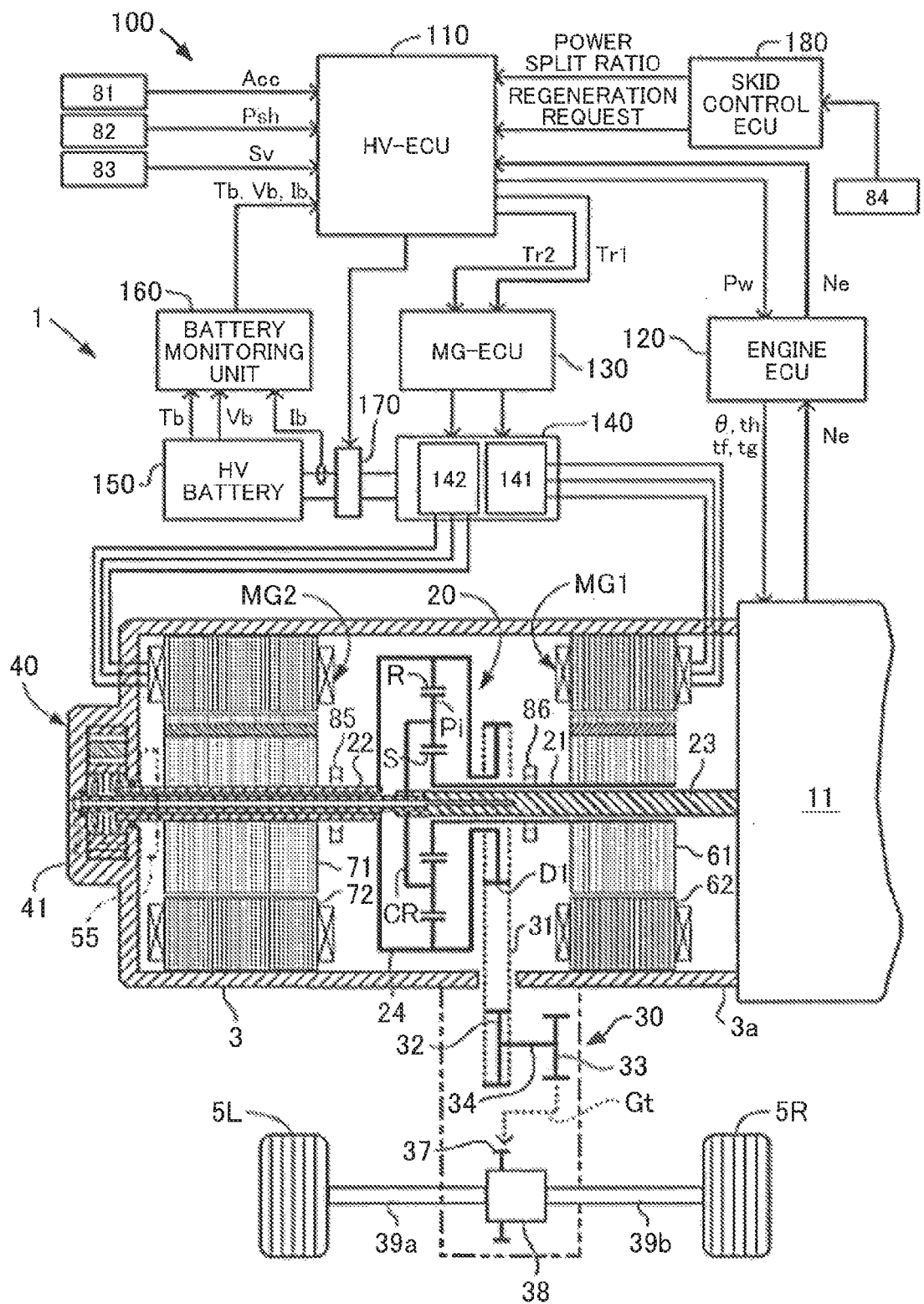
FIG. 1 is a schematic configuration view of a hybrid drive system according to a first embodiment of the invention.

As shown in FIG. 1, the hybrid drive system 1 according to the present embodiment rotationally drives right and left drive wheels 5R, 5L that are wheels for driving the vehicle. The hybrid drive system 1 includes an engine 11, a motor generator MG1 (first electric motor) and a motor generator MG2 (second electric motor) as a plurality of mutually different drive sources. the engine 11 is an internal combustion engine. Each of the motor generator MG1 (first electric motor) and the motor generator MG2 (second electric motor) is an electric motor that is able to generate electric power.

Here, the engine 11 is a multi-cylinder internal combustion engine, such as a four-cycle gasoline engine. The motor generators MG1, MG2 are accommodated inside a closed-end cylindrical transmission case 3. An open-side end 3a of the transmission case 3 is fastened to the engine 11.

The hybrid drive system 1 includes an output mechanism 20 that is able to output rotational power from at least one of the drive sources, that is, the engine 11, the motor generator MG1 or the motor generator MG2, to an external drive wheels 5L, 5R-side transmission gear mechanism 30.

The output mechanism 20 is formed as a planetary gear set including a sun gear S, a ring gear R, a carrier CR and a plurality of pinions Pi. However, the output mechanism 20 may be formed of a plurality of planetary gear sets.

The sun gear S of the output mechanism 20 is coupled to a first rotor shaft 21 that is an input/output shaft of the motor generator MG1. The ring gear R is coupled to a second rotor shaft 22 that is an input/output shaft of the motor generator MG2. The carrier CR is coupled to an input shaft 23 to which rotational power from the engine 11 is input via a damper element (not shown), and rotates integrally with the input shaft 23.

The plurality of pinions Pi are arranged between the sun gear S and the ring gear R, and are supported by the carrier CR so as to be rotatable around corresponding central axes parallel to the rotation central axis of the sun gear S. The plurality of pinions Pi are revolvable around the rotation central axis of the sun gear S when the carrier CR rotates together with the input shaft 23.

These sun gear S, ring gear R and carrier CR that supports the plurality of pinions Pi are three rotation transmission elements that engage with each other such that rotation is transmittable. The carrier CR is an input-side rotation transmission element that is coupled to the engine 11. The sun gear S is a first output-side rotating element that is coupled to the motor generator MG1. The ring gear R is a second output-side rotating element that is coupled to the motor generator MG2. Rotational power that is input from the engine 11 to the carrier CR is output from one of the sun gear S and the ring gear R, for example, the ring gear R, to an outside.

That is, when the rotational power is input to the carrier CR via the input shaft 23, the output mechanism 20 is a power split mechanism that supplies part of rotational power from the engine 11 to the motor generator MG1 via the pinions Pi and the sun gear S as power generating power and outputs the remaining part of the rotational power from an output member D1 to the outside via the pinions Pi and the ring gear R.

The output member D1 is a timing gear (which may also be a sprocket) by which rotational power is output to the transmission gear mechanism 30 toward the drive wheels 5R, 5L via an endless transmission element 31, such as a power transmission belt, and is integrally fixed to the ring gear R.

The transmission gear mechanism 30 includes a counter shaft 34 and a differential case 38. The counter shaft 34 has a timing gear 32 (which may be a sprocket) and a transmission gear 33. The timing gear 32 engages with the endless transmission element 31. A final gear 37 is provided at the differential case 38. Rotation from the counter shaft 34 is input to the final gear 37 via the transmission gear 33. A pair of right and left differential pinions and a pair of right and left differential side gears are accommodated in the differential case 38. Rotational power that is input from the final gear 37 to the differential case 38 is transmitted to the right and left drive wheels 5R, 5L via right and left wheel drive shafts 39b, 39a such that the right and left drive wheels 5R, 5L are differentially movable. Speed reduction by the plurality of gears 32, 33, 34, 37, and the like, and a differential mechanism in the differential case 38 are known, and will not be described in detail here.

When the motor generator MG2 serves as an electric motor to output rotational power, the output mechanism 20 is able to output the rotational power from the output member D1 via the ring gear R. In addition, when the motor generator MG1 serves as an electric motor to output rotational power, the output mechanism 20 is able to reduce the rotational power in speed via the sun gear S, the plurality of pinions Pi and the ring gear R and output the rotational power from the output member D1.

In this way, the output mechanism 20 is able to output rotational power from at least one drive source, that is, the engine 11, the motor generator MG1 or the motor generator MG2, to the outside in response to the operation states of the engine 11 and motor generators MG1, MG2.

Figure 2:
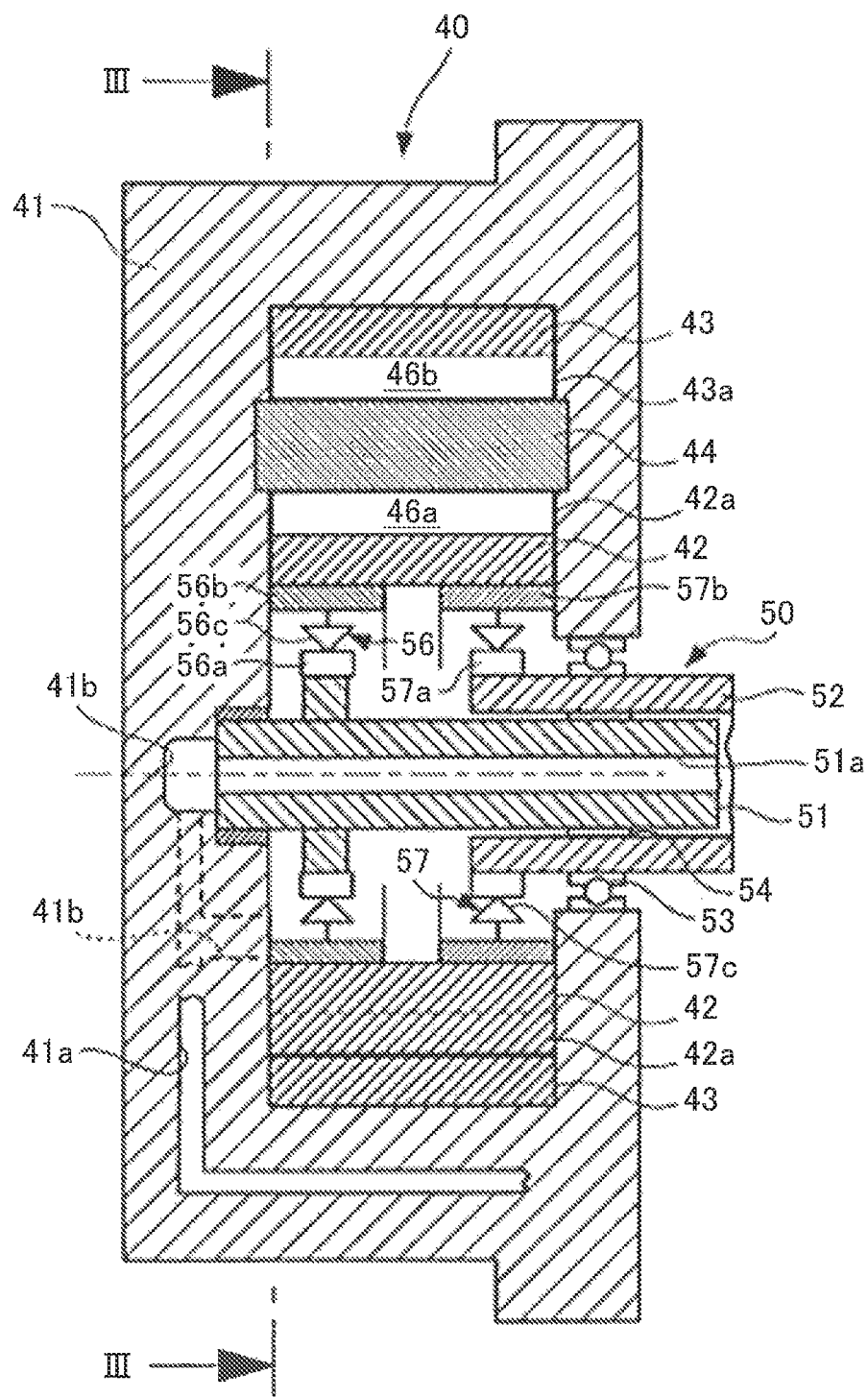
FIG. 2 is a partially enlarged view of FIG. 1, showing an oil pump in the hybrid drive system according to the first embodiment of the invention.
Figure 3:
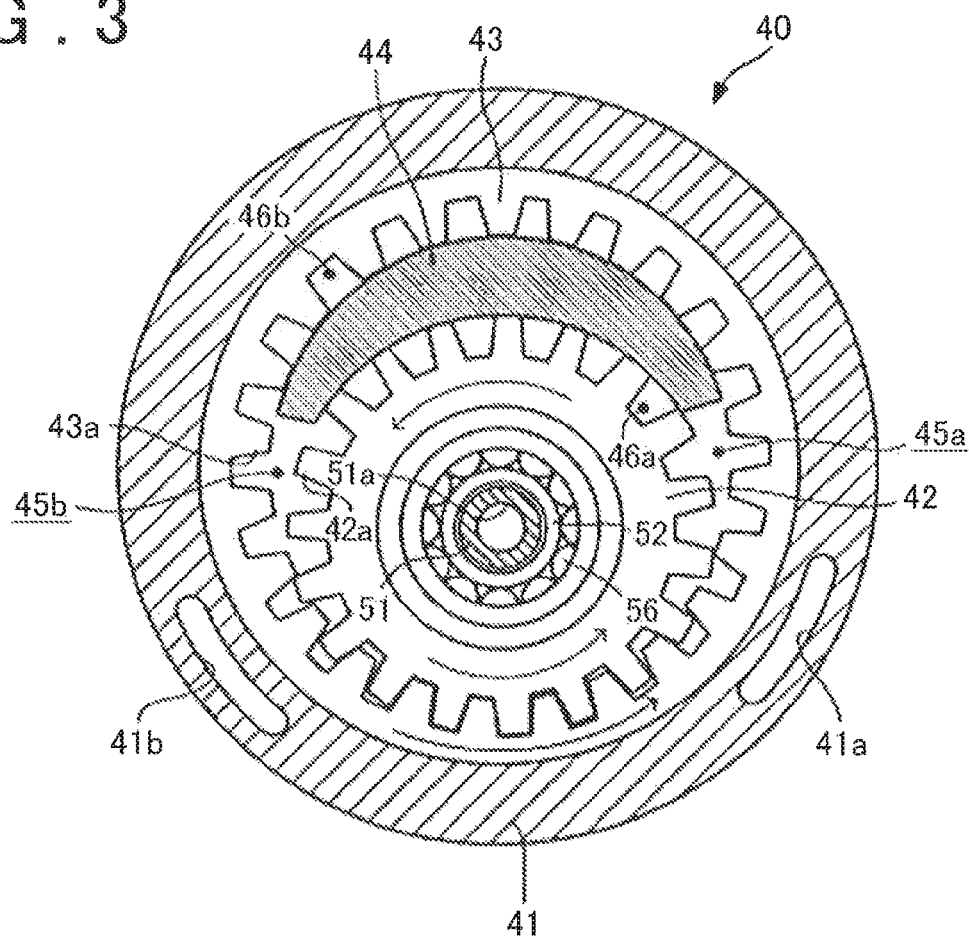
FIG. 3 is a cross-sectional view taken along the line III-III in FIG. 2.

As shown in FIG. 2 and FIG. 3, the hybrid drive system 1 further includes an oil pump 40 and a pump input selecting mechanism 50. The oil pump 40 is configured as a gear pump. The pump input selecting mechanism 50 has the function of alternatively selecting input to the oil pump 40 from among the plurality of rotary shafts.

The oil pump 40 includes a pump housing 41 integrally fixed to the transmission case 3. Although the detailed shape of any one of them is not shown, a suction passage 41a and a discharge passage 41b are formed in the pump housing 41. The suction passage 41a draws oil from a reservoir (not shown). The discharge passage 41b supplies oil, pressurized and discharged by the oil pump 40, into an oil passage 51a in an input rotary shaft 51.

An annular external gear-shaped drive gear 42, which is a pump rotor, and an annular internal gear-shaped driven gear 43 are provided in the pump housing 41. Meshing teeth 42a at the outer peripheral side of the drive gear 42 are inscribed in and meshed with meshing teeth 43a at the inner peripheral side of the driven gear 43. The driven gear 43 is rotatably accommodated in the pump housing 41. Thus, when the drive gear 42 rotates, the driven gear 43 that is in mesh with the drive gear 42 is rotationally driven in the same rotation direction as the drive gear 42.

A crescent seal member 44 is arranged between the driven gear 43 and the drive gear 42 in a predetermined rotation section in which the meshing teeth 42a, 43a of them are separated from each other. The crescent seal member 44 is fixed to the pump housing 41.

The meshing teeth 42a, 43a of the driven gear 43 and drive gear 42 are in slidable contact with the crescent seal member 44 within the corresponding predetermined rotation sections. Thus, a suction chamber 45a and a discharge chamber 45b mutually partitioned from each other by the crescent seal member 44 are defined between the driven gear 43 and the drive gear 42. The suction chamber 45a communicates with the suction passage 41a. The discharge chamber 45b communicates with the discharge passage 41b.

In addition, a plurality of oil transfer chambers 46a, 46b substantially closed by the crescent seal member 44 are formed between the meshing teeth 42a, 43a of the drive gear 42 and driven gear 43. These plurality of oil transfer chambers 46a, 46b transfer oil from the suction chamber 45a side to the discharge chamber 45b side with rotation of the driven gear 43 and drive gear 43.

On the other hand, the input rotary shafts 51, 52 that are hollow at one end side as shown in FIG. 2 are coaxially arranged with each other in the pump housing 41 so as to be located along the rotation central axis of the drive gear 42. These input rotary shafts 51, 52 have mutually different diameters. The input rotary shaft 51 is rotatably inserted inward of the input rotary shaft 52. The input rotary shaft 52 is rotatably supported by the pump housing 41 via a bearing 53, and retains the input rotary shaft 51 via a bearing 54 such that the input rotary shaft 51 is relatively rotatable.

As shown in FIG. 2, a one-way clutch 56 and a one-way clutch 57 are provided inward of the drive gear 42. The one-way clutch 56 is able to transmit rotational power toward one side in the rotation direction from the inner-side input rotary shaft 51 to the drive gear 42. The one-way clutch 57 is able to transmit rotational power toward one side in the rotation direction from the outer-side input rotary shaft 52 to the drive gear 42.

The one-way clutch 56 is, for example, formed of a known sprag clutch including a plurality of sprags 56c (potbellied rolling elements, sprags) between an inner ring 56a and an outer ring 56b. The one-way clutch 57 is, for example, formed of a known sprag clutch including a plurality of sprags 57c (potbellied rolling elements, sprags) between an inner ring 57a and an outer ring 57b. Each of the one-way clutches 56, 57 is able to transmit torque from one of the input rotary shafts 51, 52 to the drive gear 42 side when one of the sets of sprags 56c, 57c is inclined in a specific inclined direction by relative rotation between the drive gear 42 and the input rotary shaft 51 or between the drive gear 42 and the input rotary shaft 52. That is, each of the one-way clutches 56, 57 is able to transmit rotational power between the drive gear 42 and the input rotary shaft 51 or between the drive gear 42 and the input rotary shaft 52 when one of the inner rings 56a, 57a and one of the outer rings 56b, 57b are integrally engaged (hereinafter, referred to as engaged state) via the sprags 56c or the sprags 57c.

As shown in FIG. 1, the input rotary shaft 51 is integrally coupled to the input shaft 23, and the input rotary shaft 52 is coupled to the second rotor shaft 22. However, as indicated by the imaginary line in FIG. 1, a gear speed reducer 55 may be interposed in a power transmission path from the input shaft 23 to the input rotary shaft 51 and a power transmission path from the second rotor shaft 22 to the input rotary shaft 52. The gear speed reducer 55 is able to reduce power, which is transmitted from the input shaft 23 and the second rotor shaft 22 to the input rotary shafts 51, 52, in speed at, for example, corresponding speed reduction ratios $\alpha$, $\beta$.

The plurality of input rotary shafts 51, 52 and the one-way clutches 56, 57 have the function of alternatively selecting input to the oil pump 40 from between the input shaft 23 and the second rotor shaft 22 in cooperation with each other, and constitute the pump input selecting mechanism 50 as a whole.

In this way, the pump input selecting mechanism 50 is able to change input of rotational power to the drive gear 42 of the oil pump 40 between from the input shaft 23 that inputs rotational power from the engine 11 and from the second rotor shaft 22 coupled to the output member D1. Here, the input shaft 23 and the second rotor shaft 22 are a plurality of rotary shafts that are able to receive rotational power from the plurality of drive sources, that is, the engine 11 and the motor generators MG1, MG2, during electric motor operation.

Figure 4:
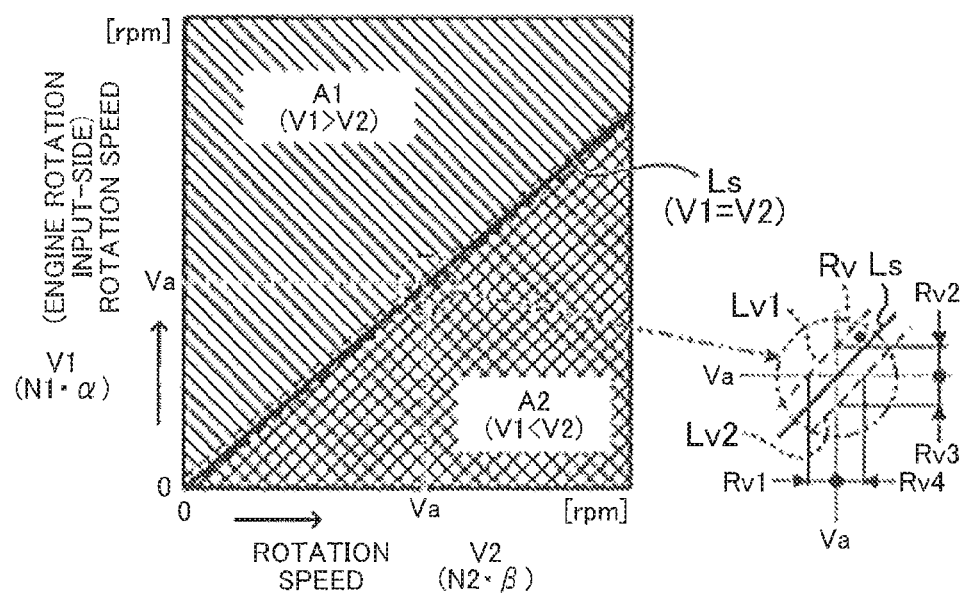
FIG. 4 is a view that illustrates a selecting operation of a pump input selecting mechanism in the hybrid drive system according to the first embodiment of the invention.

As shown in FIG. 4, the oil pump input change characteristics of the pump input selecting mechanism 50 are divided into a first change region A1 and a second change region A2 by a change line Ls set at the operating state at which an input rotary shaft 51-side rotation speed V1 (hereinafter, also referred to as input shaft rotation speed V1) and an input rotary shaft 52-side rotation speed V2 (hereinafter, also referred to as output shaft rotation speed V2) coincide with each other. Here, the first change region A1 is a speed region in which the input shaft rotation speed V1 is higher than the output shaft rotation speed V2 and rotation is input from the input rotary shaft 51 to the drive gear 42 via the one-way clutch 56. The second change region A2 is a speed region in which the input shaft rotation speed V1 is lower than the output shaft rotation speed V2 and rotation is input from the input rotary shaft 52 to the drive gear 42 via the one-way clutch 57. When the gear speed reducer 55 is provided, the input rotary shaft 51-side rotation speed V1 corresponds to the rotation speed N1 of the input shaft 23, multiplied by the speed reduction ratio $\alpha$, and the input rotary shaft 52-side rotation speed V2 corresponds to the rotation speed N2 of the second rotor shaft 22, multiplied by the speed reduction ratio $\beta$.

The motor generator MG1 is, for example, configured as a permanent magnet synchronous generator motor including an inner magnet-type rotor 61 and a stator 62. The rotor 61 is allowed to utilize reluctance torque by arranging each of a plurality of permanent magnets in a substantially V shape. Three-phase coils are wound in the stator 62. The rotor 61 is rotatably supported by the input shaft 23 via a needle bearing (not shown), and is rotatably supported by the transmission case 3 via a bearing (not shown). The first rotor shaft 21 coupled to the rotor 61 is spline-connected to the sun gear S of the output mechanism 20 at the inner-side end of the transmission case 3.

The motor generator MG2 is, for example, configured as a permanent magnet synchronous motor including an inner magnet-type rotor 71 and a stator 72. The rotor 71 is allowed to utilize reluctance torque by arranging each of a plurality of permanent magnets in a substantially V shape. Three-phase coils are wound in the stator 72. The second rotor shaft 22 coupled to the rotor 71 is rotatably supported by a shaft hole portion (not shown) of the transmission case 3 via a bearing, and spline-connected to a rotary drum 24, integrated with the ring gear R of the output mechanism 20 and the output member D1, at the right end side in FIG. 1. Torque that is generated by each of the motor generators MG1, MG2 is controlled by current that is supplied to a corresponding one of the stators 62, 72. The rotation speed (motor rotation speed) during electric motor operation of each of the motor generators MG1, MG2 is controlled by a power supply frequency.

Part of the pump housing 41 is an oil pump cover in which part of the suction passage 41a and the discharge passage 41b are formed and a relief valve (not shown) is accommodated. The relief valve here regulates the pressure of oil to a predetermined supply pressure. The oil is drawn from the reservoir in the transmission case 3, pressurized and discharged by the oil pump 40. Oil discharged from the oil pump 40 is supplied to gear meshing portions in the output mechanism 20 through the oil passage 51a in the input rotary shaft 51, a plurality of oil passages (no reference numerals are assigned) formed in the rotor 71 and the input shaft 23, and the like.

Incidentally, each of the motor generators MG1, MG2 serves as a drive source when operating as an electric motor, and serves as a driving load when operating as a generator. Operation states of these motor generators MG1, MG2 and operation of the engine 11 that is another drive source each are controlled by a control device 100.

The control device 100 is, for example, configured to include an HV-ECU 110, an engine ECU 120, an MG-ECU 130, an inverter 140, an HV battery 150, a battery monitoring unit 160, a system main relay 170 and a skid control ECU 180.

The HV-ECU 110 is a hybrid drive system controlling ECU (electronic control unit) that incorporates an integrated control program for executing integrated control over the engine 11 and the motor generators MG1, MG2.

The HV-ECU 110, for example, acquires a driver's required operation amount from an accelerator position sensor 81 and a shift position sensor 82 and operating state detection information, such as a vehicle speed Sv from a vehicle speed sensor 83 and an engine rotation speed Ne [rpm] from a crank angle sensor (not shown) in the engine 11. The HV-ECU 110 acquires monitoring information, such as a charging voltage, current and battery temperature of the HV battery 150, from the battery monitoring unit 160, and a required value of a driving force split ratio (the ratio between a power distributed from the engine 11 to the output member D1 and a power distributed from the engine 11 to the motor generator MG1 or the motor generator MG2 during generator operation) from the skid control ECU 180.

The HV-ECU 110 calculates a total output value of the hybrid drive system 1, a command value Pw of power (engine power) and an engine rotation speed Ne that are required for the engine 11 and command values Tr1, Tr2 of required torques (required driving torques or required power generation load torques) for the motor generators MG1, MG2, on the basis of these pieces of input information, and respectively output those command values Pw, Ne to the engine ECU 120 and those torque command values Tr1, Tr2 to the MG-ECU 130.

The HV-ECU 110 constantly acquires a discharged amount and regenerated amount of the HV battery 150 on the basis of the power supply monitoring information from the battery monitoring unit 160, calculates an SOC (state of charge) [%] corresponding to a charged amount ratio to the total battery capacity of the HV battery 150, and limits a fluctuation range of the SOC within a predetermined usage fluctuation range set in view of the reliability and service life of the HV battery 150, and the like.

Additionally, the HV-ECU 110, in cooperation with the skid control ECU 180, executes traction control. In traction control, on the basis of detection information of wheel speed sensors, or the like, that detect the rotation speeds of the drive wheels 5L, 5R, when driving force starts steeply changing due to a tire slip on a low μ road, or the like, the torque command values Tr1, Tr2 of the motor generators MG1, MG2 are immediately changed, and driving force corresponding to accelerator operation is transmitted to a road surface.

The engine ECU 120 has a control program and a map for controlling the output of the engine 11 on the basis of the power command value Pw and various pieces of sensor information from the HV-ECU 110. When the power command value Pw is input to the engine ECU 120, the engine ECU 120 calculates a throttle opening degree, a fuel injection time (fuel injection amount and injection period) and ignition timing, at which an engine output corresponding to the power command value Pw is obtained, on the basis of the map and the various pieces of sensor information. The engine ECU 120 outputs a throttle opening degree control signal θth and an ignition drive signal tg of a fuel injection control signal tf to an electronic throttle valve, an injector (fuel injection valve) and an ignition coil (which are not shown) in response to the input power command value Pw. The HV-ECU 110 and the engine ECU 120 may be integrally configured as a hybrid control computer.

The MG-ECU 130 has a control program for controlling the motor generators MG1, MG2 via the inverter 140, and operates in response to the torque command values Tr1, Tr2 from the HV-ECU 110. The MG-ECU 130 controls the output torques and rotation speeds of the motor generators MG1, MG2 that serve as electric motors and the load torques of the motor generators MG1, MG2 that serve as generators in response to the command values Tr1, Tr2. The MG-ECU 130 is, for example, able to highly efficiently control the motor generators MG1, MG2 by acquiring the rotation positions of the permanent magnets in the inner magnet-type rotors 61, 71 of the motor generators MG1, MG2 and the rotation speeds of both the rotors 61, 71 on the basis of a detection signal of a resolver 85 arranged near the first rotor shaft 21 and a detection signal of a resolver 86 arranged near the second rotor shaft 22.

The inverter 140 includes a step-up converter that steps up the voltage of the HV battery 150 to a high voltage, and includes a plurality of inverter units 141, 142 that carry out conversion between a high-voltage current and three-phase alternating currents of the motor generators MG1, MG2. These plurality of inverter units 141, 142 are able to supply drive currents to the motor generators MG1, MG2 at any voltage and frequency within a predetermined range in response to the command values from the MG-ECU 130. Each of the inverter units 141, 142 is able to convert alternating current, generated by the corresponding motor generator MG1 or motor generator MG2, to direct current for charging the HV battery 150. The inverter 140 further includes a DC-DC converter that is able to charge a 12V battery.

The HV battery 150 is able to supply electric power to one of the motor generators MG1, MG2, which operates as an electric motor during at the time of start, acceleration, climbing, or the like, of the vehicle, and is able to be charged to store electric power with generated power (for example, regenerative power generation current during deceleration) from one of the motor generators MG1, MG2, which operates as a generator.

The battery monitoring unit 160 outputs power supply monitoring information indicating the voltage Vb, current Ib and temperature Tb of the HV battery 150 to the HV-ECU 110.

The system main relay 170 is interposed between the inverter 140 and the HV battery 150, and switches between connection and interruption of a high-voltage current circuit in response to a relay control signal from the HV-ECU 110.

The skid control ECU 180 has the function of outputting a required value of regenerative brake braking force by the motor generator MG1 or motor generator MG2, which serves as a generator, to the HV-ECU 110 by calculating the required value on the basis of a brake operation amount that is detected by a brake operation amount sensor 84, and executing coordinated control over the regenerative brake braking force and hydraulic brake braking force. The skid control ECU 180 is able to output an optimal driving force distribution ratio between the front and rear drive wheels based on a traveling state of the vehicle to the HV-ECU 110 by calculating the optimal driving force distribution ratio on the basis of various pieces of sensor information when the vehicle is driven in a four-wheel drive mode, or is able to control the torques of the motor generators MG1, MG2 or electronically control hydraulic brake braking force when the torque command values Tr1, Tr2 for traction control, or the like, are received from the HV-ECU 110.

Although detailed hardware configurations are not shown, the above-described HV-ECU 110, engine ECU 120, MG-ECU 130 and skid control ECU 180 each are, for example, configured to include a CPU, a ROM, a RAM and a rewritable nonvolatile memory (or a backup RAM) and also include an input interface circuit having an A/D converter, an output interface circuit having a driver and a relay switch, a communication port for data communication with other in-vehicle ECUs, and the like. A system program, such as a real-time OS, a device driver and a middle ware, is stored in each ROM described here. For example, application programs for executing various controls are stored in the ROM and the rewritable nonvolatile memory (hereinafter, simply referred to as the ROM, and the like), and various maps, set value data, and the like, are stored in the ROM and the rewritable nonvolatile memory.

A pump input change suppressing control program and maps, set value data, and the like, that are used in the control program are stored in the ROM and rewritable nonvolatile memory of the HV-ECU 110.

The pump input change suppressing control program executes control for changing the rotation speeds V1, V2 of the input rotary shafts 51, 52 so as to fall outside a preset equal speed region Rv (speed difference range corresponding to a speed fluctuation range) shown in FIG. 4 on the condition that, in a state where any one of the input rotary shafts 51, 52, for example, the input rotary shaft 51 having a relatively high rotation speed, is driving the drive gear 42 of the oil pump 40, the rotation speed V2 of the other input rotary shaft 52 falls within the equal speed region Rv with respect to the rotation speed V1 of the input rotary shaft 51. That is, in a state where the rotation speeds V1, V2 of the input rotary shafts 51, 52 fall within the preset equal speed region Rv, the HV-ECU 110 controls the rotation speeds V1, V2 of the input rotary shafts 51, 52 to unequal speeds by controlling the operation state of at least one of the engine 11 and the motor generators MG1, MG2.

Specifically, as shown in the partially enlarged view in FIG. 4, the equal speed region Rv includes one-side speed difference range (indicated by Rv1, Rv2) from the change line Ls, at which the rotation speeds V1, V2 of the input rotary shafts 51, 52 coincide with each other, to the dashed line Lv1 on the first change region A1 side and the other-side speed difference range (indicated by Rv3, Rv4) from the change line Ls to the dashed line Lv2 on the second change region A2 side. The equal speed region Rv corresponds to a speed fluctuation range to such a degree corresponding to rotation fluctuations of the engine 11 and rotation fluctuations of a road fluctuation component from the drive wheels 5R, 5L. Thus, when the rotation speeds V1, V2 substantially coincide with each other to such a degree that the rotation speeds V1, V2 fall within the equal speed region Rv, the fluctuation ranges of the rotation speeds V1, V2 overlap by a large amount, so the on/off states of the one-way clutches 56, 57 may occur at a higher frequency than usual beyond an allowable frequency in terms of durability in the two pump driving paths respectively including the input rotary shafts 51, 52 and the one-way clutches 56, 57.

Here, controlling the rotation speeds V1, V2 to unequal speeds not only includes keeping the rotation speeds V1, V2 of the input rotary shafts 51, 52 in an unequal speed state without temporarily causing the rotation speeds V1, V2 in an equal speed state but also keeping the rotation speeds V1, V2 in a stable unequal speed state after temporarily causing the rotation speeds V1, V2 in an equal speed state. That is, controlling the rotation speeds V1, V2 to unequal speeds may be controlling the rotations of the input rotary shafts 51, 52 to unequal speeds to such a degree that the frequency at which the rotation speeds V1, V2 of the input rotary shafts 51, 52 become equal speeds is lower than or equal to the allowable frequency.

More specifically, as shown in FIG. 4, the HV-ECU 110 increases the speed difference between the input rotary shafts 51, 52 by changing the operation state of at least one of the engine 11 and the motor generators MG1, MG2 when the rotation speed V2 of the input rotary shaft 52 increases to such a degree that the rotation speed V2 falls within the one-side speed difference range Rv1 in a state where the input rotary shaft 51 is driving the oil pump 40 at a rotation speed Va. The HV-ECU 110 increases the speed difference between the input rotary shafts 51, 52 by changing the operation state of at least one of the engine 11 and the motor generators MG1, MG2 when the rotation speed V1 of the input rotary shaft 51 decreases to such a degree that the rotation speed V1 falls within the one-side speed difference range Rv2 in a state where the input rotary shaft 51 is driving the oil pump 40 at a rotation speed higher than the rotation speed Va and the input rotary shaft 52 is rotating at the rotation speed Va.

Alternatively, the HV-ECU 110 increases the speed difference between the input rotary shafts 51, 52 by changing the operation state of at least one of the engine 11 and the motor generators MG1, MG2 when the rotation speed V1 of the input rotary shaft 51 increases to such a degree that the rotation speed V1 falls within the other-side speed difference range Rv3 in a state where the input rotary shaft 52 is driving the oil pump 40 at the rotation speed Va. The HV-ECU 110 increases the speed difference between the input rotary shafts 51, 52 by changing the operation state of at least one of the engine 11 and the motor generators MG1, MG2 when the rotation speed V2 of the input rotary shaft 52 decreases to such a degree that the rotation speed V1 falls within the other-side speed difference range Rv4 in a state where the input rotary shaft 52 is driving the oil pump 40 at a rotation speed higher than the rotation speed Va and the input rotary shaft 51 is rotating at the rotation speed Va.

These speed difference ranges Rv1 to Rv4 are set to fixed values (fixed speed ranges) or set to constant ratios to the rotation speed Va (for example, several % or below with respect to the selected rotation speed Va) on the basis of predetermined target values and preliminary test results for the service life of each of the one-way clutches 56, 57 and the durability of the hybrid drive system 1.

Here, the rotation speed V1 of the engine rotation input-side input rotary shaft 51 of the output mechanism 20 that is able to split power is calculated on the basis of the engine rotation speed Ne that is obtained from detection information of the crank angle sensor or in addition to the detection signals of the resolvers 85, 86, the speed reduction ratio of the output mechanism 20, a speed reduction ratio when the gear speed reducer 55 is interposed, and the like. The rotation speed V2 of the input rotary shaft 52, corresponding to the output shaft-side rotation speed of the output mechanism 20, is calculated on the basis of the detection signal of the resolver 85 arranged near the second rotor shaft 22 or on the basis of the detection speeds of the wheel speed sensors that detect the rotation speeds of the drive wheels 5R, 5L, the speed reduction ratio in the transmission gear mechanism 30, and the like.

Control for increasing the relative rotation speed between the input rotary shafts 51, 52 by changing the operation state of at least one of the engine 11 and the motor generators MG1, MG2 is as follows.

The HV-ECU 110 of the control device 100 executes the following control in accordance with the state of charge of the HV battery 150 and the traveling state of the vehicle at that time, for example, when one of the input rotary shafts 51, 52 falls within the equal speed region Rv with respect to the other one that is operated along the change line Ls in accordance with the pump input change suppressing control program stored in the ROM, or the like.

For example, the HV-ECU 110 changes the power generation load (load torque) of the motor generator MG1 by changing the torque command value Tr1 corresponding to the power generation load of the motor generator MG1 to a value different from the immediately preceding command value on the basis of the remaining level of the HV battery 150. Thus, the HV-ECU 110 increases the speed difference between the input rotary shafts 51, 52. In this case, if the amount of charge (SOC) of the HV battery 150 increases before the change and the power generation load of the motor generator MG1 is gradually reduced, it is possible to end a period of time during which one of the input rotary shafts 51, 52 falls within the equal speed region Rv with respect to the other one in a short period of time by changing the power generation load in a direction to accelerate the rate of reduction in the power generation load. Of course, if the amount of charge of the HV battery 150 is small and the power generation load of the motor generator MG1 is gradually increased, it is also possible to change the power generation load in a direction to accelerate the rate of increase in the power generation load.

Alternatively, the HV-ECU 110 is able to increase the relative rotation speed between the input rotary shafts 51, 52 by changing the ratio between the required power Pw and one or both of the torque command values Tr1, Tr2 to a ratio different from the usual one with respect to the power split ratio that is required from the skid control ECU 180. In this case, when the amount of charge of the HV battery 150 is small, the ratio of the required power command value Pw of the engine 11 is allowed to be increased; whereas, when the amount of charge of the HV battery 150 is large, torque (absolute value) corresponding to the power generation load of the motor generator MG1 is allowed to be increased.

Furthermore, when one of the input rotary shafts 51, 52 falls within the equal speed region Rv with respect to the other one, the HV-ECU 110, for example, shifts the range in which fluctuations in SOC are allowed (charging usage range) to one of a discharging side and a regeneration side depending on whether the current SOC is higher than or equal to a predetermined value such that the amount of charge of the HV battery 150 per unit time is changed.

Next, the operation will be described.

In the thus configured hybrid drive system 1 according to the present embodiment, when at least one of the engine 11, the motor generator MG1 and the motor generator MG2 rotates, a condition that one of the input rotary shafts 51, 52 is able to drive the drive gear 42 of the oil pump 40 is satisfied.

When the other rotation speed V2 or rotation speed V1 of the input rotary shaft 52 or the input rotary shaft 51 is close to the one of the rotation speed V1 or rotation speed V2 of the input rotary shaft 51 or input rotary shaft 52 to such a degree that the other rotation speed V2 or rotation speed V1 falls within the equal speed region Rv, one or a plurality of operation states of the engine 11 and the motor generators MG1, MG2 are controlled such that the rotation speeds V1, V2 of both the input rotary shafts 51, 52 are not equal to each other.

Thus, when the possibility of a frequent repetition of a selection change of the input rotary shafts 51, 52 in the pump input selecting mechanism 50 increases because of substantial coincidence between the rotation speeds V1, V2 of both the input rotary shafts 51, 52 within the corresponding fluctuation ranges, one or a plurality of operation states of the engine 11 and the motor generators MG1, MG2 are immediately controlled such that the rotation speed difference between both the input rotary shafts 51, 52 increases, so the frequency of a useless selection change decreases in the pump input selecting mechanism 50.

In the present embodiment, when one of the input rotary shafts 51, 52 falls within the equal speed region Rv with respect to the other one, the control device 100 changes the power generation load of the motor generator MG1. Thus, when the possibility of a frequent repetition of a selection change of the input rotary shafts in the pump input selecting mechanism 50 increases, the rotation speed V2 or rotation speed V1 of the other input rotary shaft 52 or input rotary shaft 51 changes in a direction to expand the speed difference with respect to the rotation speed V or rotation speed V2 of the one input rotary shaft 51 or input rotary shaft 52, which is driving the oil pump 40, because of a change in the power generation load of the motor generator MG1, with the result that the rotation speeds V1, V2 of both the input rotary shafts 51, 52 are not equal to each other, and the frequency of a useless selection change decreases.

In the present embodiment, in addition, when one of the input rotary shafts 51, 52 falls within the equal speed region Rv with respect to the other one, the control device 100 changes the amount of charge (charging current corresponding thereto) of the HV battery 150 per unit time. Thus, when the possibility of a frequent repetition of a selection change of the input rotary shafts 51, 52 in the pump input selecting mechanism 50 increases, the amount of charge of the HV battery 150 changes, so the power command value Pw that is required for the engine 11 changes. Thus, the rotation speed V2 or rotation speed V1 of the other input rotary shaft 52 or input rotary shaft 51 changes in a direction to expand the speed difference with respect to the rotation speed V1 or rotation speed V2 of the one input rotary shaft 51 or input rotary shaft 52, having a large relative rotation speed for rotating the oil pump 40, with the result that the rotation speeds V1, V2 of both the input rotary shafts 51, 52 are not equal to each other, and the frequency of a useless selection change decreases.

In the present embodiment, the input-side carrier CR of the output mechanism 20 is coupled to the engine 11, and the output-side sun gear S and ring gear R are coupled to the motor generators MG1, MG2. Thus, the output mechanism 20 can be a simple power split mechanism. Moreover, because the control device 100 controls the power generation load of the motor generator MG1, which allows rotation speed control independent of a vehicle speed, it is possible to appropriately control the rotation speeds V1, V2 of the input rotary shafts 51, 52 to unequal speeds as needed such that the rotation speeds V1, V2 fall outside the equal speed region Rv.

FIG. 5 is a flowchart that shows the schematic procedure of the pump input change suppressing control program that is repeatedly executed at preset control intervals of the HV-ECU 110 in the control device 100 in the hybrid drive system 1 according to the first embodiment of the invention.

As shown in FIG. 5, in the present embodiment, initially, in the HV-ECU 110 of the control device 100, in cooperation with the engine ECU 120, a target input rotation speed N1 for the input shaft 23 and the carrier CR, corresponding to the engine rotation speed Ne, is calculated at the preset control intervals of the HV-ECU 110 (step S11), and an output shaft rotation speed N2 that is the rotation speed of the ring gear R and output member D1 is detected on the basis of the detection information of the resolver 85 (step S12).

Subsequently, it is determined whether the rotation speeds V1, V2 of the input rotary shafts 51, 52 substantially coincide with each other, that is, whether one of the input rotary shafts 51, 52 falls within the equal speed region Rv with respect to the other one that is operated along the change line Ls (step S13). Determination here may be determination as to whether the rotation speeds V1, V2 of the input rotary shafts 51, 52 both fall within the equal speed region Rv in one rotation speed direction in FIG. 4 (the vertical direction or horizontal direction in FIG. 4). If the gear speed reducer 55 is provided, in this determination step, it is determined whether a rotation speed value N1·α obtained by multiplying the target input rotation speed N1 by the speed reduction ratio α of the gear speed reducer 55 in the power transmission path from the input shaft 23 to the input rotary shaft 51 falls within a predetermined speed difference range with respect to a rotation speed value N2·β obtained by multiplying the output shaft rotation speed N2 by the speed reduction ratio β of the gear speed reducer 55 in the power transmission path from the second rotor shaft 22 to the input rotary shaft 52.

At this time, when the rotation speeds of the input rotary shafts 51, 52 do not fall within the equal speed region Rv in which the rotation speeds substantially coincide with each other and the determination result is negative (in the case of No in step S13), the current process is ended.

On the other hand, at this time, when the rotation speeds of the input rotary shafts 51, 52 fall within the equal speed region Rv in which the rotation speeds substantially coincide with each other and the determination result is affirmative (in the case of Yes in step S13), subsequently, the torque command value Tr1 is output for changing the power generation load of the motor generator MG1 such that the amount of charge is changed, and the power command value Pw of the engine 11 is changed. Thus, the engine rotation speed Ne changes such that the rotation speed difference between the input rotary shafts 51, 52 increases.

Before the change of the power generation load, if the amount of charge (SOC) of the HV battery 150 increases and the power generation load of the motor generator MG1 is gradually reduced, it is possible to end a period of time during which one of the input rotary shafts 51, 52 falls within the equal speed region Rv with respect to the other one in a short period of time by changing the power generation load in a direction to accelerate the rate of reduction in the power generation load. Of course, if the amount of charge of the HV battery 150 is small and the power generation load of the motor generator MG1 is gradually increased, it is also possible to change the power generation load in a direction to accelerate the rate of increase in the power generation load.

Subsequently, the current process is ended.

In this way, in the present embodiment, when the rotation speeds V1, V2 of the input rotary shafts 51, 52 that rotate the drive gear 42 of the oil pump 40 fall within the equal speed region Rv, the operation state of one of the engine 11 and the motor generators MG1, MG2, for example, the motor generator MG1, is controlled such that both the rotation speeds V1, V2 are not equal to each other, so the amount of charge of the HV battery 150 is changed. Thus, when the possibility of a frequent repetition of a selection change of the input rotary shafts 51, 52 in the pump input selecting mechanism 50 increases because of substantial coincidence between the rotation speeds V1, V2 of both the input rotary shafts 51, 52, it is possible to immediately decrease the selection change frequency by expanding the rotation speed difference between both the input rotary shafts 51, 52 such that both the input rotary shafts 51, 52 have unequal speeds. As a result, it is possible to suppress a useless change of the pump driving path, in which the on/off states of the one-way clutches 56, 57 are repeated in a short period of time, and to provide the hybrid drive system 1 having a high durability.

In the above-described first embodiment, the control device 100 changes the power generation load of the motor generator MG1 on the condition that one of the input rotary shafts 51, 52 falls within the equal speed region Rv with respect to the other one. Of course, a different function like the control device 100 in each of the embodiments described below may also be included in combination.

Each of the following embodiments differs from the above-described first embodiment in the content of the oil pump input change suppressing control program that is executed by the control device 100, and the major components of the traveling drive system and control system are configured substantially similarly to the above-described first embodiment. Thus, in the following description, the reference numerals of the corresponding components in the first embodiment shown in FIG. 1 to FIG. 4 are used for the same or similar components to those of the above-described first embodiment, and the difference of each embodiment will be specifically described.

Second Embodiment

FIG. 6 shows the flow of the oil pump input change suppressing control program that is executed in a hybrid drive system according to a second embodiment of the invention.

In the present embodiment, when one of the input rotary shafts 51, 52 falls within the equal speed region Rv with respect to the other one, the HV-ECU 110 of the control device 100 changes the engine rotation speed or the corresponding engine output torque without changing the power command value Pw that is required for the engine 11.

In this case, the HV-ECU 110 may have a map that allows selection of a plurality of different command values Ne for the required power command value Pw, and the engine ECU 120 may incorporate a plurality of types of map such that, when a different command value Ne is selected for the required power command value Pw, control values, such as ignition timing, valve timing and throttle opening degree, corresponding to the command value Ne, are allowed to be determined.

In the control device 100 in the hybrid drive system 1 according to the present embodiment, the pump input change suppressing control program as shown in FIG. 6 is executed at control intervals of the HV-ECU 110.

As shown in FIG. 6, initially, as in the case of the above-described first embodiment, the HV-ECU 110 of the control device 100, in cooperation with the engine ECU 120, calculates the target input rotation speed N1 for the input shaft 23 and the carrier CR, corresponding to the engine rotation speed Ne, at the preset control intervals of the HV-ECU 110 (step S11), and detects the output shaft rotation speed N2 that is the rotation speed of the ring gear R and output member D1 on the basis of the detection information of the resolver 85 (step S12).

Subsequently, it is determined whether the rotation speeds of the input rotary shafts 51, 52 substantially coincide with each other, that is, whether the relative rotation speed of one of the input rotary shafts 51, 52 with respect to the other one falls within the equal speed region Rv (step S13).

At this time, when the rotation speeds of the input rotary shafts 51, 52 do not fall within the equal speed region Rv in which the rotation speeds substantially coincide with each other and the determination result is negative (in the case of No in step S13), the current process is ended.

On the other hand, at this time, when the rotation speeds of the input rotary shafts 51, 52 fall within the equal speed region Rv in which the rotation speeds substantially coincide with each other and the determination result is affirmative (in the case of Yes in step S13), subsequently, the control values are changed in the engine ECU 120 such that the command value Ne of the engine rotation speed or the corresponding engine output torque is changed along a constant Pe line along which the power command value Pw that is required for the engine 11 does not change in the operating region of the engine 11 (step S24). Thus, at least one of the ignition timing, valve timing, throttle opening degree, and the like, of the engine 11 changes, and the rotation speed Ne or torque of the engine 11 changes along the constant Pe line, so the rotation speeds of the input rotary shafts 51, 52 are controlled to unequal speeds.

In this way, in the present embodiment, when one of the input rotary shafts 51, 52 falls within the equal speed region Rv with respect to the other one, the control device 100 controls the rotation speeds of the input rotary shafts 51, 52 to unequal speeds by changing the rotation speed or torque of the engine 11 while keeping the power command value Pw of the engine 11. Thus, when the possibility of a frequent repetition of a selection change of the input rotary shafts 51, 52 in the pump input selecting mechanism 50 increases, the rotation speed of the engine 11 changes, so the frequency of a selection change in the pump input selecting mechanism 50 decreases. As a result, it is possible to suppress a useless change of the pump driving path, in which the on/off states of the one-way clutches 56, 57 are repeated in a short period of time, and to provide the hybrid drive system 1 having a high durability.

Moreover, in the present embodiment, the rotation speed or torque of the output of the engine 11 is changed by changing any one of the ignition timing, valve timing and throttle opening degree of the engine 11, so the output of the engine 11 does not need to be substantially changed, and it is possible to appropriately change the rotation speed or torque of the engine output along the constant Pe line with the use of the existing engine control system without making a driver experience an output change.

Third Embodiment

Figure 7:
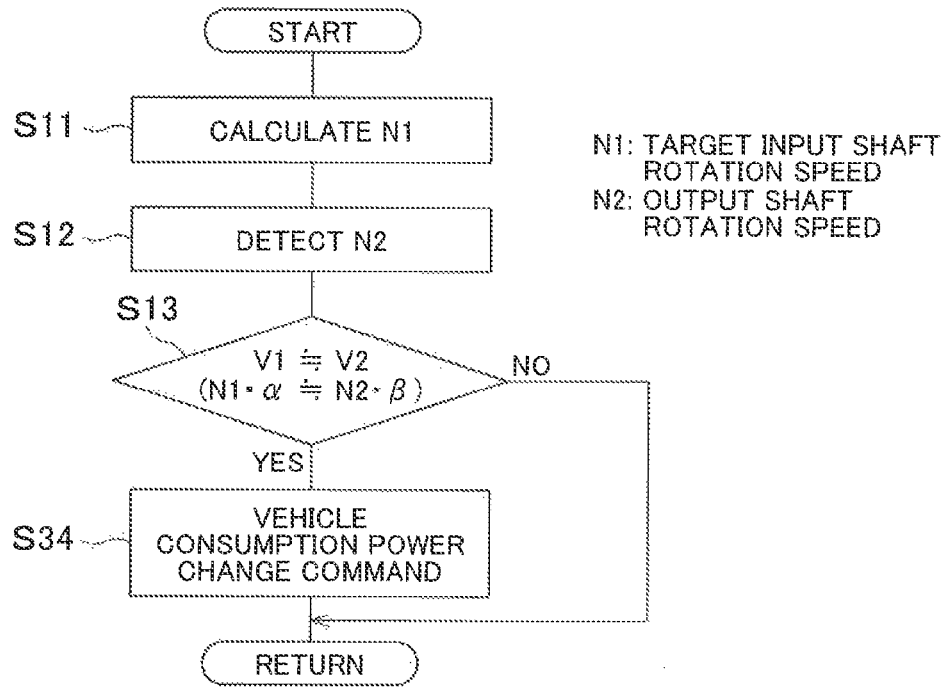
FIG. 7 is a flowchart that shows the flow of an oil pump input change suppressing control program that is executed in a hybrid drive system according to a third embodiment of the invention.

FIG. 7 shows the flow of an oil pump input change suppressing control program that is executed in a hybrid drive system according to a third embodiment of the invention.

In the present embodiment, the HV-ECU 110 is able to change the operation states of auxiliaries, such as a refrigerant compressing electric compressor of an air conditioner, and other electric actuators mounted on the vehicle, such that the amount of discharge of the HV battery 150 per unit time is changed, and to increase the relative rotation speed between the input rotary shafts 51, 52 by changing the consumed power slightly.

For example, it is possible to increase or reduce the amount of discharge of the HV battery 150 per unit time by changing the set temperature of the air conditioner within a slight temperature change range (for example, the range of 0.5° C.) in which the driver or another passenger does not experience the change. The auxiliaries here are not specifically limited as long as an another vehicle mounted device that serves as an electric load, and may be a room lamp, a meter indicator, and the like. In this case, the electric load of the auxiliaries changes within the range in which a change is not experienced by the driver or another passenger.

In the control device 100 in the hybrid drive system 1 according to the present embodiment, the pump input change suppressing control program as shown in FIG. 7 is executed at control intervals of the HV-ECU 110.

As shown in FIG. 7, initially, as in the case of the above-described first embodiment, the HV-ECU 110 of the control device 100, in cooperation with the engine ECU 120, calculates the target input rotation speed N1 for the input shaft 23 and the carrier CR, corresponding to the engine rotation speed Ne, at the preset control intervals of the HV-ECU 110 (step S11), and detects the output shaft rotation speed N2 that is the rotation speed of the ring gear R and output member D1 on the basis of the detection information of the resolver 85 (step S12).

Subsequently, it is determined whether the rotation speeds of the input rotary shafts 51, 52 substantially coincide with each other, that is, whether the relative rotation speed of one of the input rotary shafts 51, 52 with respect to the other one falls within the equal speed region Rv (step S13).

At this time, when the rotation speeds of the input rotary shafts 51, 52 do not fall within the equal speed region Rv in which the rotation speeds substantially coincide with each other and the determination result is negative (in the case of No in step S13), the current process is ended.

On the other hand, at this time, when the rotation speeds of the input rotary shafts 51, 52 fall within the equal speed region Rv in which the rotation speeds substantially coincide with each other and the determination result is affirmative (in the case of Yes in step S13), subsequently, a vehicle consumption power change command is output such that the operation states of the auxiliaries that serve as electric loads are changed (step S34). Thus, when the possibility of a frequent repetition of a selection change of the input rotary shafts 51, 52 in the pump input selecting mechanism 50 increases, the operation states of the air conditioner refrigerant compressing electric compressor, other electric actuators, and the like, change, so the vehicle consumption power is changed, the power command value Pw that is required for the engine 11 changes, and the frequency of a selection change of the pump input selecting mechanism 50 decreases as in the case of the above.

In this way, in the present embodiment, when one of the input rotary shafts 51, 52 falls within the equal speed region Rv with respect to the other one, the control device 100 changes the operation states of the auxiliaries that operate on generated power from one of the motor generators MG1, MG2 (including electric power stored in the HV battery 150). Thus, when the possibility of a frequent repetition of a selection change of the input rotary shafts 51, 52 in the pump input selecting mechanism 50 increases, the vehicle consumption power is immediately changed, the power command value Pw that is required for the engine 11 changes, so the frequency of a selection change decreases as in the case of the above. As a result, it is possible to suppress a useless change of the pump driving path, in which the on/off states of the one-way clutches 56, 57 are repeated in a short period of time, and to provide the hybrid drive system 1 having a high durability.

Fourth Embodiment

Figure 8:
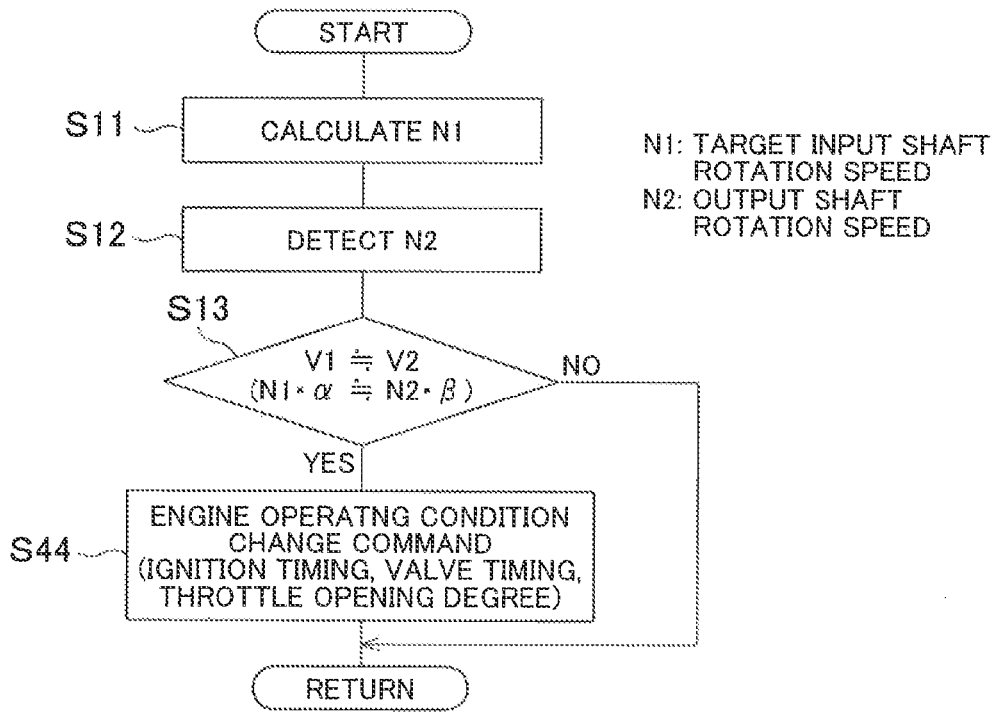
FIG. 8 is a flowchart that shows the flow of an oil pump input change suppressing control program that is executed in a hybrid drive system according to a fourth embodiment of the invention.

FIG. 8 shows the flow of an oil pump input change suppressing control program that is executed in a hybrid drive system according to a fourth embodiment of the invention.

In the present embodiment, when one of the input rotary shafts 51, 52 falls within the equal speed region Rv with respect to the other one, the HV-ECU 110 of the control device 100 outputs a command to change the operating condition of the engine 11. Specifically, the HV-ECU 110 is able to change the rotation speed of the engine 11 by changing the ignition timing of the engine 11, the valve timing, of an intake valve or exhaust valve, the throttle opening degree, or the like, in cooperation with the engine ECU 120.

In the control device 100 in the hybrid drive system 1 according to the present embodiment, the pump input change suppressing control program as shown in FIG. 8 is executed at control intervals of the HV-ECU 110.

As shown in FIG. 8, initially, as in the case of the above-described first embodiment, the HV-ECU 110 of the control device 100, in cooperation with the engine ECU 120, calculates the target input rotation speed N1 for the input shaft 23 and the carrier CR, corresponding to the engine rotation speed Ne, at the preset control intervals of the HV-ECU 110 (step S11), and detects the output shaft rotation speed N2 that is the rotation speed of the ring gear R and output member D1 on the basis of the detection information of the resolver 85 (step S12).

Subsequently, it is determined whether the rotation speeds of the input rotary shafts 51, 52 substantially coincide with each other, that is, whether the relative rotation speed of one of the input rotary shafts 51, 52 with respect to the other one falls within the equal speed region Rv (step S13).

At this time, when the rotation speeds of the input rotary shafts 51, 52 do not fall within the equal speed region Rv in which the rotation speeds substantially coincide with each other and the determination result is negative (in the case of No in step S13), the current process is ended.

On the other hand, at this time, when the rotation speeds of the input rotary shafts 51, 52 fall within the equal speed region Rv in which the rotation speeds substantially coincide with each other and the determination result is affirmative (in the case of Yes in step S13), subsequently, the command to change the operating condition of the engine 11 is output, the control values for controlling the ignition timing, valve timing and throttle opening degree of the engine 11 are changed, and the engine rotation speed Ne is changed such that the rotation speeds V1, V2 of the input rotary shafts 51, 52 are not equal to each other (step S44).

In this way, in the present embodiment, when one of the input rotary shafts 51, 52 falls within the equal speed region Rv with respect to the other one, the control device 100 changes the ignition timing, valve timing, throttle opening degree, and the like, of the engine 11 by outputting a command to change the operating condition of the engine 11, and, as a result, changes the engine rotation speed Ne. Thus, when the possibility of a frequent repetition of a selection change of the input rotary shafts 51, 52 in the pump input selecting mechanism 50 increases, the rotation speed of the engine 11 is changed with the use of the existing engine control system, so the rotation speeds V1, V2 of both the input rotary shafts 51, 52 are controlled to unequal speeds, and the frequency of a useless selection change in the pump input selecting mechanism 50 decreases. As a result, it is possible to suppress a useless change of the pump driving path, in which the on/off states of the one-way clutches 56, 57 are repeated in a short period of time, with the use of the existing engine control system, and to provide the hybrid drive system 1 having a high durability.

Fifth Embodiment

Figure 9:
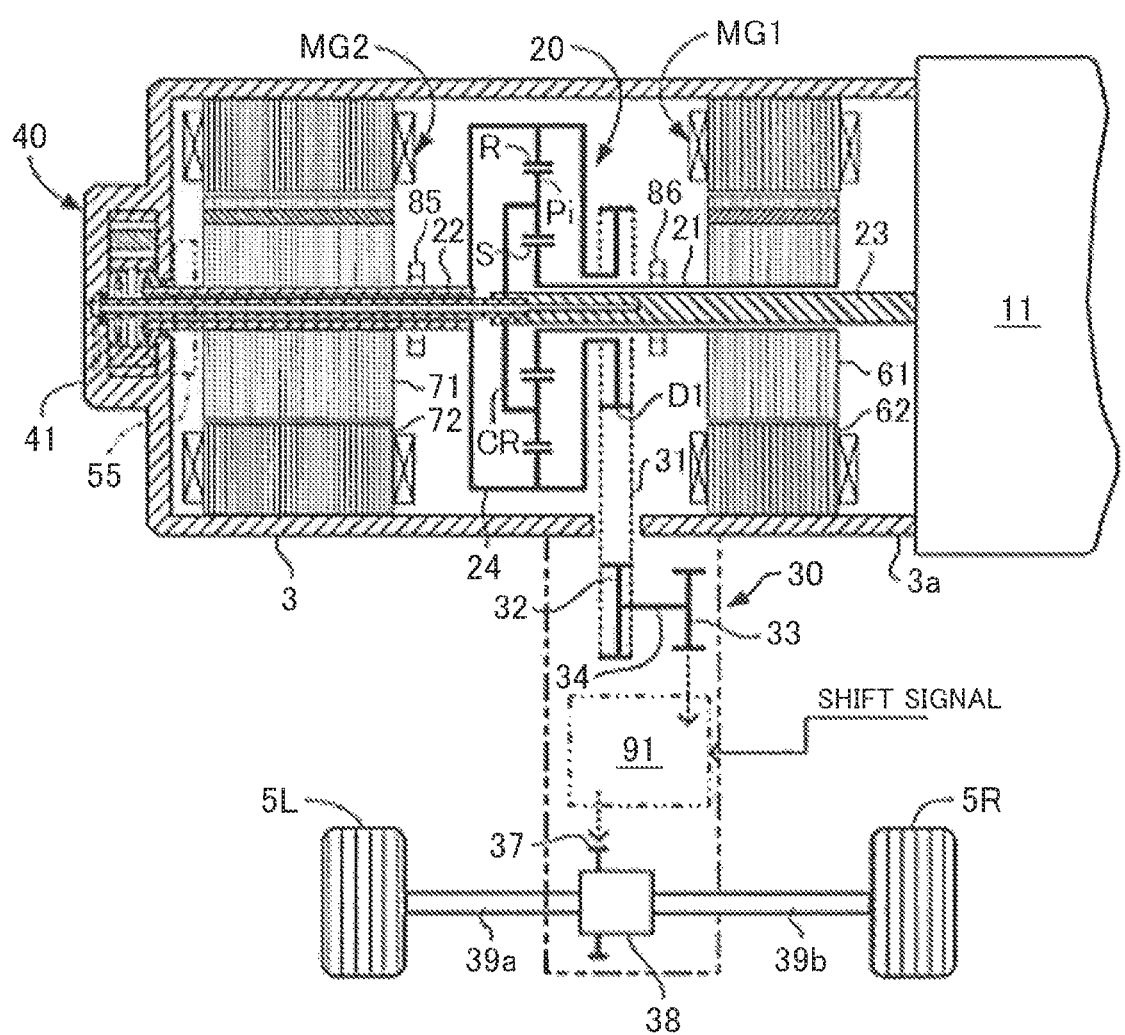
FIG. 9 is a relevant portion schematic configuration view of a hybrid drive system according to a fifth embodiment of the invention.
Figure 10:
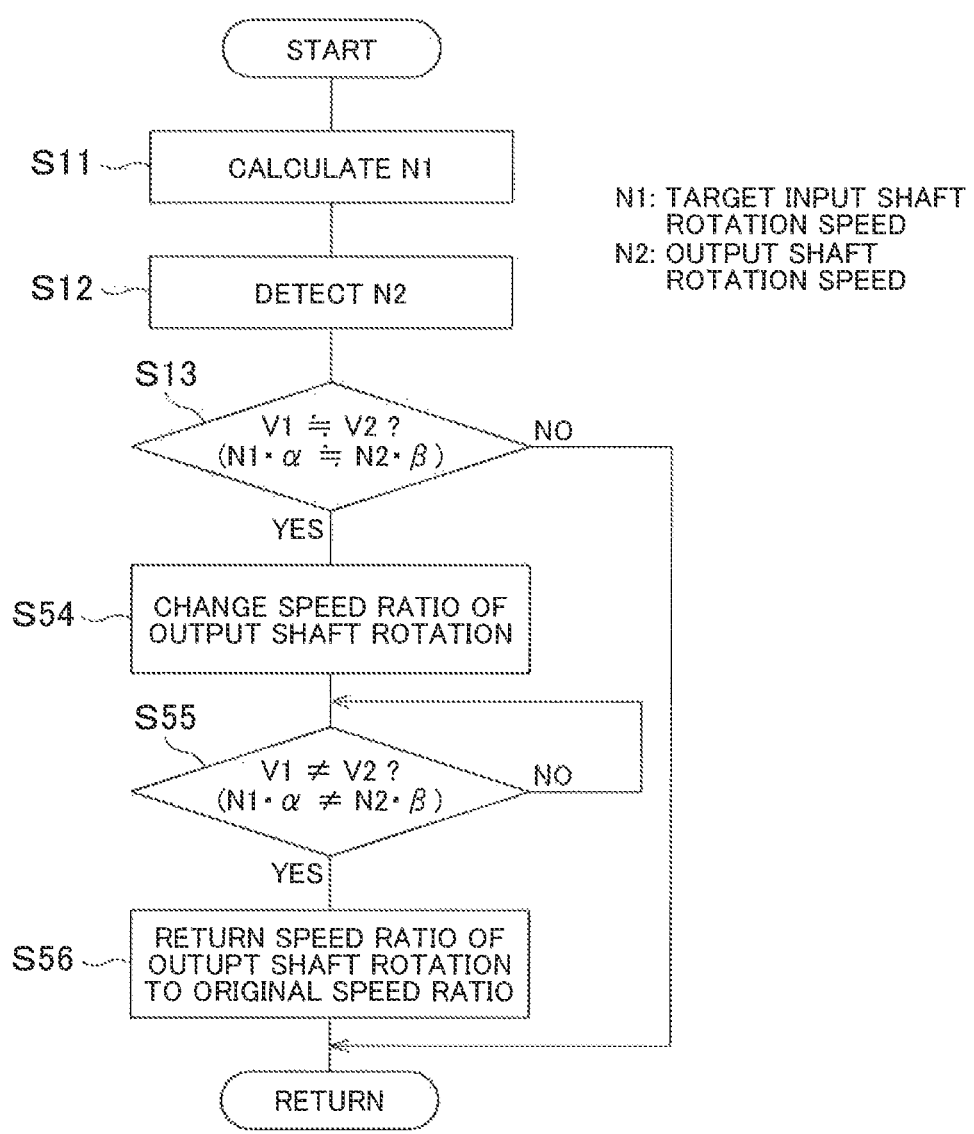
FIG. 10 is a flowchart that shows the flow of an oil pump input change suppressing control program that is executed in the hybrid drive system according to the fifth embodiment of the invention.

FIG. 9 and FIG. 10 respectively show the relevant portion schematic configuration of a hybrid drive system according to a fifth embodiment of the invention and the flow of an oil pump input change suppressing control that is executed in the control device.

In the present embodiment, as shown in FIG. 9, the hybrid drive system 1 further includes a known variable speed ratio transmission mechanism 91 (not shown in detail) in the drive wheels 5L, 5R-side transmission gear mechanism 30. The variable speed ratio transmission mechanism 91 shifts rotational power that is output from the output mechanism 20.

The transmission mechanism 91, for example, incorporates an electric actuator (not shown) that operates in response to a command signal from an in-vehicle ECU (not shown). The transmission mechanism 91 is able to shift the rotation speed of the output rotation power with respect to the input rotational power in accordance with the speed ratio and is able to change the speed ratio to at least high and low two steps, for example, three-step different speed ratios.

The HV-ECU 110 of the control device 100 increases the rotation speed difference between both the input rotary shafts 51, 52 by shifting the speed ratio of the transmission mechanism 91 to, for example, another speed ratio (low-speed-side or high-speed-side speed ratio) different from an ordinary speed ratio (for example, an intermediate speed ratio) on the basis of the SOC of the HV battery 150, the vehicle speed Sv, and the like, when the rotation speeds of the input rotary shafts 51, 52 fall within the equal speed region Rv in which the rotation speeds substantially coincide with each other, in cooperation with the another in-vehicle ECU that executes shift control over the transmission mechanism 91.

In addition, the HV-ECU 110 of the control device 100 returns the speed ratio of the transmission mechanism 91 to the original ordinary speed ratio when the rotation speed difference between both the input rotary shafts 51, 52 increases to such a degree as to fall outside the equal speed region Rv in which the rotation speeds of the input rotary shafts 51, 52 substantially coincide with each other.

In the control device 100 in the hybrid drive system 1 according to the present embodiment, the pump input change suppressing control program as shown in FIG. 10 is executed at control intervals of the HV-ECU 110.

As shown in FIG. 10, initially, as in the case of the above-described first embodiment, the HV-ECU 110 of the control device 100, in cooperation with the engine ECU 120, calculates the target input rotation speed N1 for the input shaft 23 and the carrier CR, corresponding to the engine rotation speed Ne, at the preset control intervals of the HV-ECU 110 (step S11), and detects the output shaft rotation speed N2 that is the rotation speed of the ring gear R and output member D1 on the basis of the detection information of the resolver 85 (step S12).

Subsequently, it is determined whether the rotation speeds of the input rotary shafts 51, 52 substantially coincide with each other, that is, whether the relative rotation speed of one of the input rotary shafts 51, 52 with respect to the other one falls within the equal speed region Rv (step S13).

At this time, when the rotation speeds of the input rotary shafts 51, 52 do not fall within the equal speed region Rv in which the rotation speeds substantially coincide with each other and the determination result is negative (in the case of No in step S13), the current process is ended.

On the other hand, at this time, when the rotation speeds of the input rotary shafts 51, 52 fall within the equal speed region Rv in which the rotation speeds substantially coincide with each other and the determination result is affirmative (in the case of Yes in step S13), subsequently, the command value of the speed ratio of output shaft rotation, which specifies the speed ratio of the transmission mechanism 91, is changed, the command value is transmitted to the another in-vehicle ECU, and the speed ratio of the transmission mechanism 91 is changed from an ordinary speed ratio to another speed ratio (step S54).

Subsequently, it is determined whether the rotation speeds of the input rotary shafts 51, 52 fall outside the equal speed region Rv in which the rotation speeds substantially coincide with each other, that is, whether the relative rotation speed of one of the input rotary shaft 51, 52 with respect to the other one increases to such a degree such that the relative rotation speed falls outside the equal speed region Rv (step S55).

At this time, when the determination result is negative (in the case of No in step S55), the determination step S55 is repeated until the determination result becomes affirmative.

When the determination result is affirmative (in the case of Yes in step S55), the command value of the speed ratio of output shaft rotation, which specifies the speed ratio of the transmission mechanism 91 again, is transmitted to the another in-vehicle ECU, and the speed ratio of the transmission mechanism 91 is returned from the another speed ratio to the original ordinary speed ratio (step S56).

In this way, in the present embodiment, when the rotation speeds of the input rotary shafts 51, 52 fall within the equal speed region Rv in which the rotation speeds substantially coincide with each other and the possibility of a frequent repetition of a selection change of the input rotary shafts 51, 52 in the pump input selecting mechanism 50 increases, the speed ratio of the transmission mechanism 91 is shifted to a different speed ratio that can expand the rotation speed difference between the input rotary shafts 51, 52. Thus, the rotation speed that is required for the engine 11 changes, the rotation speed V2 of the input rotary shaft 52, which is dependent on the vehicle speed, is changed, and the rotation speeds V1, V2 of the input rotary shafts 51, 52 change in a direction to expand the speed difference, so the rotation speeds V1, V2 of both the input rotary shafts 51, 52 are not equal to each other, and the frequency of a useless selection change decreases. As a result, it is possible to suppress a useless change of the pump driving path, in which the on/off states of the one-way clutches 56, 57 are repeated in a short period of time, and to provide the hybrid drive system 1 having a high durability.

Moreover, in the present embodiment, when the rotation speeds of the input rotary shafts 51, 52 fall outside the equal speed region Rv, the speed ratio of the transmission mechanism 91 is returned to the original speed ratio. Therefore, when the possibility of a frequent repetition of a selection change of the input rotary shafts 51, 52 in the pump input selecting mechanism 50 decreases, the speed ratio of the transmission mechanism 91 is shifted to the ordinary speed ratio optimal to low fuel consumption running, and the fuel consumption of the engine 11 improves.

In the hybrid drive system 1 according to each of the above-described embodiments, when the rotation speeds V1, V2 of the input rotary shafts 51, 52 both fall within the equal speed region Rv, control parameters for specifying the amount of charge, and the like, that influences on the relative rotation speed between the input rotary shafts 51, 52 are changed by the pump input change suppressing control program. However, of course, appropriate control parameters may be selected from among a large number of control parameters and changed, or a plurality of control parameters may be changed at the same time.

In each of the above-described embodiments, when the rotation speeds V1, V2 of the input rotary shafts 51, 52 fall within the equal speed region Rv, pump input change suppressing control is immediately started. Instead, pump input change suppressing control may be started further on the condition that a state where the rotation speeds V1, V2 of the input rotary shafts 51, 52 fall within the equal speed region Rv continues over a preset standby time (for example, several seconds). Similarly, when the speed ratio is returned to the ordinary speed ratio in the fifth embodiment, continuation of a state where the rotation speeds V1, V2 of the input rotary shafts 51, 52 fall outside the equal speed region Rv over a preset standby time may be set as an additional condition.

When the standby time is set, one rotary shaft of the plurality of rotary shafts, on which a pump driving condition is satisfied, is a rotary shaft that is rotating at a high speed immediately before the relative rotation speed between the input rotary shafts 51, 52 is expanded, and the different rotary shaft is a rotary shaft that is rotating at a lower speed than the one rotary shaft within the equal speed region Rv immediately before the relative rotation speed is expanded. In other words, it is conceivable to set the direction of a change at the time of relatively changing the rotation speeds V1, V2 of the input rotary shafts 51, 52 by controlling the operation state of any one of the engine 11 and the motor generators MG1, MG2 in a direction to reduce the relative speed between both the input rotary shafts 51, 52 at the time when the fact that the rotation speeds V1, V2 of the input rotary shafts 51, 52 fall within the equal speed region Rv is detected and a direction to expand the relative speed between both the input rotary shafts 51, 52 so as to fall outside the equal speed region Rv after crossing the change line Ls once.

The oil pump 40 is a gear pump; however, the oil pump 40 does not always need to be a gear pump and may be a pump of any type as long as the pump pressurizes and discharges oil by rotating a rotor. Of course, a plurality of drive sources that drive the input rotary shafts 51, 52 do not need to include a plurality of electric motors.

As described above, the hybrid drive system according to the invention controls the operation states of a plurality of drive sources such that the rotation speeds of both rotary shafts are not equal to each other when the rotation speed of the other rotary shaft becomes close to the rotation speed of one rotary shaft that is rotating a pump rotor. Thus, when the possibility of a frequent repetition of a selection change of the input rotary shafts in the pump input selecting mechanism increases because of substantial coincidence of the rotation speeds of both the rotary shafts, it is possible to immediately suppress the frequency of a selection change appropriately by changing the rotation speeds of both the rotary shafts. As a result, it is possible to suppress a useless change of the pump driving path and to provide the hybrid drive system having a high durability. The thus configured invention is useful in a general hybrid drive system including an oil pump that is able to change input on the basis of the operation states of a plurality of drive sources.

DESCRIPTION OF REFERENCE NUMERALS 1 hybrid drive system
3 transmission case
5L, 5R drive wheel
11 engine (internal combustion engine)
20 output mechanism (power split mechanism)
23 input shaft (engine rotation input shaft)
30 transmission gear mechanism
40 oil pump
41a suction passage
41b discharge passage
42 drive gear (pump rotor)
46a, 46b oil transfer chamber
50 pump input selecting mechanism
51, 52 input rotary shaft
56, 57 one-way clutch
91 transmission mechanism
100 control device
110 HV-ECU
120 engine ECU
130 MG-ECU
140 inverter
150 HV battery (main battery)
160 battery monitoring unit
CR carrier (input-side rotation transmission element)
D1 output member
N1 target input rotation speed (input shaft-side required rotation speed)
N2 output shaft rotation speed (output shaft-side rotation speed)
MG1 motor generator (electric motor that is able to generate electric power, first electric motor)
MG2 motor generator (electric motor that is able to generate electric power, second electric motor)
R ring gear (second output-side rotating element)
Rv equal speed region
Rv1, Rv2 one-side speed difference range (equal speed region)
Rv3, Rv4 the other-side speed difference range (equal speed region)
S sun gear (first output-side rotating element)
Tr1, Tr2 torque command value
V1, V2 rotation speed

The invention claimed is:

1. A hybrid drive system including: a plurality of mutually different drive sources; an output mechanism configured to output rotational power from at least one of the plurality of drive sources to an outside on the basis of operation states of the plurality of drive sources; a control device configured to control the operation states of the plurality of drive sources; an oil pump including a pump rotor that rotates so as to pressurize and discharge oil; and a pump input selecting mechanism including a plurality of rotary shafts to which rotational power from each of the drive sources is inputable and configured to cause the pump rotor to rotate with the use of one of the rotary shafts, having a higher rotation speed,
wherein the control device changes the operation state of one of the plurality of drive sources such that the rotation speeds of the plurality of rotary shafts are returned to fall outside a preset equal speed region on the condition that the rotation speeds of the plurality of rotary shafts fall within the equal speed region.

2. The hybrid drive system according to claim 1, wherein the plurality of drive sources include an internal combustion engine and an electric motor that is able to generate electric power, and
the control device changes a power generation load of the electric motor on the condition that the rotation speeds of the plurality of rotary shafts fall within the equal speed region.

3. The hybrid drive system according to claim 2, further comprising:
a battery configured to be charged with generated electric power from the electric motor, wherein
the control device changes an amount of charge of the battery on the condition that the rotation speeds of the plurality of rotary shafts fall within the equal speed region.

4. The hybrid drive system according to claim 2, further comprising:
auxiliaries configured to operate on generated electric power from the electric motor, wherein
the control device changes operation states of the auxiliaries on the condition that the rotation speeds of the plurality of rotary shafts fall within the equal speed region.

5. The hybrid drive system according to claim 1, wherein the plurality of drive sources include an internal combustion engine, and
the control device changes a rotation speed or torque of the internal combustion engine while keeping an output of the internal combustion engine on the condition that the rotation speeds of the plurality of rotary shafts fall within the equal speed region.

6. The hybrid drive system according to claim 1, further comprising:
a transmission mechanism configured to shift the rotational power that is output from the output mechanism, and
the control device shifts a speed ratio of the transmission mechanism to a different speed ratio on the condition that the rotation speeds of the plurality of rotary shafts fall within the equal speed region.

7. The hybrid drive system according to claim 6, wherein the control device returns the speed ratio of the transmission mechanism to an original speed ratio when the rotation speeds of the plurality of rotary shafts fall outside the equal speed region.

8. The hybrid drive system according to claim 1, wherein the electric motor includes a first electric motor and a second electric motor, each of which is able to generate electric power,
the output mechanism includes three rotation transmission elements that engage with each other such that rotation is transmittable,
the three rotation transmission elements include an input-side rotation transmission element that is coupled to the internal combustion engine, a first output-side rotating element that is coupled to the first electric motor, and a second output-side rotating element that is coupled to the second electric motor, rotational power that is input from the internal combustion engine to the input-side rotation transmission element is output from the second output-side rotating element to the outside, and the control device changes a power generation load of the first electric motor on the condition that the rotation speeds of the plurality of rotary shafts fall within the preset equal speed region.

* * * * *